United States Patent [19]

Curtis et al.

[11] 4,072,081
[45] Feb. 7, 1978

[54] TENSION INDICATING WASHER UNIT

[75] Inventors: Gary Martin Curtis, Elgin; David Prugh Wagner, Geneva, both of Ill.

[73] Assignee: Illinois Tool Works Inc., Chicago, Ill.

[21] Appl. No.: 803,707

[22] Filed: June 6, 1977

Related U.S. Application Data

[63] Continuation of Ser. No. 632,135, Nov. 14, 1975, abandoned.

[51] Int. Cl.² ............................................. F16B 31/02
[52] U.S. Cl. ....................................................... 85/62
[58] Field of Search ............... 85/61, 62, 50 R, 50 A, 85/50 B, 50 C; 151/35, 38; 73/88 F

[56] References Cited

U.S. PATENT DOCUMENTS

| 1,125,565 | 1/1915 | Krupp | 85/50 R X |
|---|---|---|---|
| 1,641,059 | 8/1927 | Tausch | 151/38 |
| 2,159,393 | 5/1939 | McCrudden | 151/38 |
| 2,464,152 | 3/1949 | Ralston | 85/62 |
| 2,625,581 | 1/1953 | Jenner et al. | 85/50 C X |
| 3,072,093 | 1/1963 | Lanius | 85/62 X |
| 3,216,303 | 11/1965 | Melzer | 85/62 |
| 3,439,541 | 4/1969 | Gilder | 73/141 A X |
| 3,474,701 | 10/1969 | Setzler | 85/62 |
| 3,476,010 | 11/1969 | Markey | 85/62 |
| 3,519,096 | 7/1970 | Lunzer | 73/141 A X |
| 3,742,808 | 7/1973 | Trembley | 85/61 X |
| 3,881,392 | 5/1975 | Curtis | 85/62 |

FOREIGN PATENT DOCUMENTS

| 125,562 | 7/1931 | Austria | 151/38 |
|---|---|---|---|
| 837,051 | 11/1938 | France | 151/38 |
| 107,992 | 7/1943 | Sweden | 85/50 R |

*Primary Examiner*—Roy D. Frazier
*Assistant Examiner*—Thomas J. Holko
*Attorney, Agent, or Firm*—Thomas W. Buckman; Robert W. Beart

[57] ABSTRACT

A multipiece, preassembled washer unit incorporating an upper washer and a lower conical washer with a ring gauge interposed between the outer marginal surfaces of the washers so that the gauge is clamped between the superimposed washers upon compression of the unit to a predetermined amount. The clamping of the gauge being indicative of a predetermined accurate tension level in the joint. The ring gauge including means to accurately size itself and thereby accommodate and/or minimize errors due to tolerances in cold headed clamping members.

10 Claims, 8 Drawing Figures

TENSION INDICATING WASHER UNIT

This is a continuation of application Ser. No. 632,135, filed Nov. 14, 1975, and now abandoned.

BACKGROUND OF THE INVENTION

The present invention relates generally to a fastener device capable of providing an indication of tension in a fastened joint.

The present invention more particularly relates to an improvement in a tension indicating device wherein a compressible spring washer is utilized in conjunction with a gauge to be clamped between the spring washer and a bearing surface providing a condition which is directly relatable to tension in the joint.

Prior art devices of this general type generally rely upon a particular configuration of a nut or bolt head as the means for clamping the gauge between the nut or bolt head and the spring washer. Quite often, an accurate indication of tension is required in a joint which utilizes a somewhat standard bolt head or nut body configuration. It is often desired to place the tension indicating portion of the fastened joint in the joint at the time of application rather than utilize a device which is preassembled to a nut or bolt member.

Accordingly, it is a general object of the invention to provide a washer unit which is capable of accurately indicating tension in a joint.

It is another object of the invention to provide a tension indicating washer unit which may be utilized with a variety of bolt head styles and/or nut body styles.

Still another object of the invention is to provide a multipiece, preassembled washer unit which is capable of simultaneously providing a spring to a joint and providing an indication of the attainment of a predetermined tension level in the joint. Still another important object of the invention is the provision of a tension indicating washer preassembled unit which is relatively insensitive to the various tolerance ranges which may exist in the manufacture of standard cold headed or formed fasteners, such as nuts or bolts.

These and other objects and advantages are obtained in the present invention in which a multipiece washer unit is comprised of an upper load accepting washer and a lower conical-type spring washer which are joined at their inner peripheral margins and which a ring-type cup-shaped gauge is positioned near the outer peripheral margins of each washer and preassembled therebetween. As a bolt or nut member is torqued, the spring washer will compress, diminishing a gap between the lowermost outer peripheral margin of the upper washer and the upper surface of the spring washer to the point where the gauge is pinched between the surfaces. At this point, the gauge will no longer be free to rotate relative to the washer members, thus providing an indication of the attainment of a predetermined tension level. The preferred embodiment of the preassembled washer unit includes an upper washer having a slight draft or conical shape to insure that load is applied at the inner peripheral margin thereof. A cup gauge member is preferably formed to include upstanding side walls which are corrugated so that they may contact the outer periphery of the upper washer and be laterally sized thereon.

A particular advantage of the structure utilized in the present invention is the ability to serially arrange a plurality of washer units having increasing resistance to compression thereby enabling the user to be consecutively apprised of increasing tension levels in the joint.

The foregoing and other objects and advantages will become more apparent from the following detailed description when considered in conjunction with the accompanying drawings, wherein like reference numerals throughout the various views of the drawings are intended to designate similar elements of the component.

DETAILED DESCRIPTION OF PREFERRED EMBODIMENTS

Figure 1:
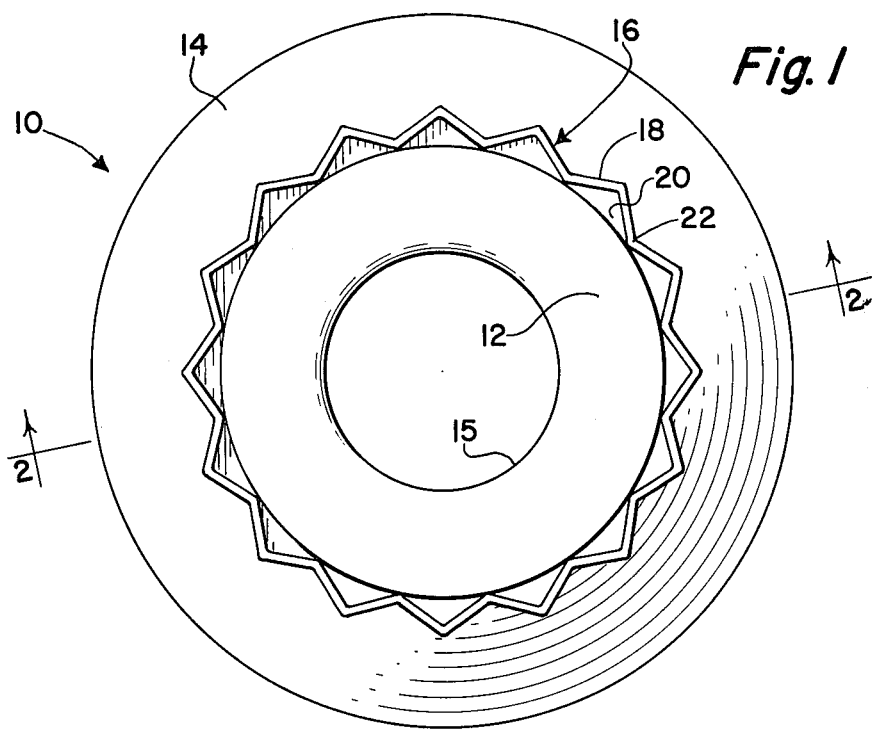
FIG. 1 is a top plan view of the multipiece, preassembled washer unit of the invention.

Referring first to FIGS. 1-4, a preferred embodiment of the washer unit 10 will include a first, upper washer member 12, a second or lower washer 14 which is a conical spring-type washer and a cupshaped ring gauge 16 including a flange portion 20 and upstanding wall portions 18. The ring gauge is preassembled on the washer unit so that the flange is interposed between the marginal surface areas of the upper and lower washer. The wall portions of the ring gauge serve to accurately center the flange about the axis of the unit and will preferably be formed to include corrugations 22 with the innermost regions of the corrugation contacting the outer periphery of the washer 12.

The washer members 12 and 14 are secured against relative axial movement preferably at their inner peripheries and this may be accomplished by utilizing conventional preassembly techniques, such as swaging or the like.

Figure 4:
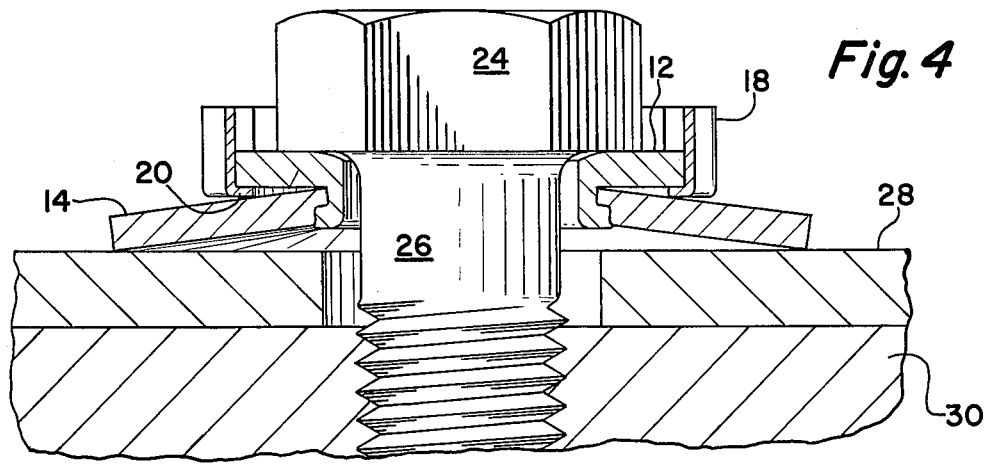
FIG. 4 is a vertical sectional view of the washer unit of the invention in use with the bolt clamping by engaging a pair of workpieces.

Attention is now directed to FIG. 4 for a general description of the operation of the washer unit 10. The washer unit may typically be utilized at a particular application by readily associating the unit 10 with a bolt. It should be noted that the bolt utilized in such a joint may be of a relatively standard configuration having a threaded shank 26 and a hexagonal head 24. As the bolt is torqued into clamping engagement with the workpieces 28 and 30 and with the washer unit 10 interposed between the bolt head and the work surface, the lowermost washer 14 will compress in a manner which is directly relatable to the force applied to the joint. Thus, the compression of the conical washer may serve as an indication of the tension in the joint. At rest, an axial gap exists between the lower, outer, peripheral surface margin of the upper washer 12 and the upper, outer, peripheral surface margin of the cone-type washer 14. As the load in the joint is increased, this gap is decreased until it equals the thickness of the flange 20 whereupon the ring gauge will be pinched and no longer free to rotate relative to either washer member. This relationship may thereby be accurately calibrated to provide an indication of a predetermined tension level in the joint. The upper washer 12 will serve as a reference surface and in effect will be the surface against which the gauge will be clamped from below as a result of the compression of the spring washer. The upper washer member also serves to protect the gauge from direct surface contact with either of the primary clamping bodies, i.e., the bolt or the workpiece surfaces. This aspect of the invention becomes important in critical applications since both of these clamping surfaces are typically of a texture or configuration which is not readily calibrated or controlled from a tolerance standpoint. Since it is quite often a requirement that the initial gap between washer members be small or that the tension to be gauged in the joint be small, tolerance errors such as these must be minimized. The washer unit described, comprising an upper washer, serving as the reference surface, and a lower spring-type washer, provides a system which is relatively insensitive to large tolerance build ups existing in many applications. The construction of a preassembled washer unit of the type described also makes it possible for the calibration of the unit to be accomplished at a single manufacturing source independent of the eventual working conditions or environment, enabling the end user to utilize any variety of styles and types of fastener units with the washer unit.

Figure 2:
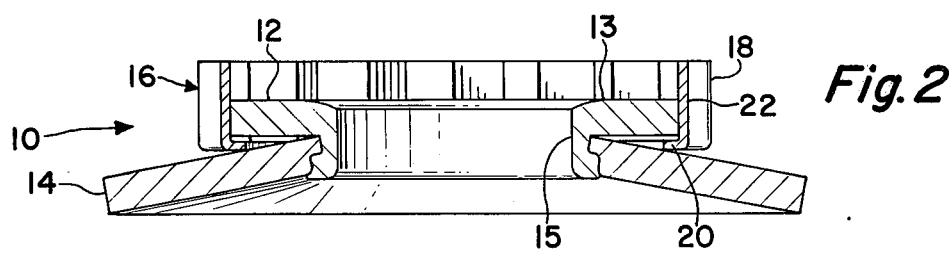
FIG. 2 is a cross-sectional view of the washer unit taken along lines 2—2 of FIG. 1.
Figure 3:
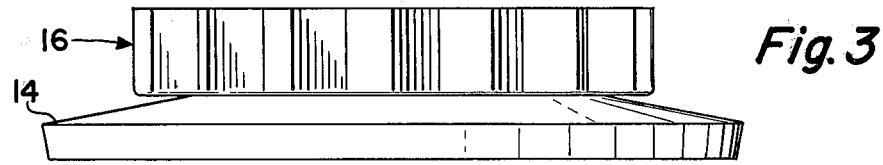
FIG. 3 is a side elevational view of the washer unit shown in FIG. 1.

A further feature of the invention relative to the calibration can be seen from FIGS. 1–3. Since it is important that the inner peripheral margin of the gauge flange 20 be concentric to the axis of the aperture 15, the side walls 18 serve an important function. Corrugations may be formed in the wall of the gauge so that it may be fitted over the outer periphery of the washer 12 and in contact with the outer periphery. This contacting association with the washer 12 in conjunction with the corrugated configuration enables the gauge to laterally size itself and align itself with the axis of the aperture. These vertical corrugations will have contacting engagement with the periphery of the washer to eliminate any loose lateral play between the gauge and the washer and which could contribute to a decrease in the accuracy of the device.

The vertical corrugations 22 providing essentially V-shaped wall sections interconnected to one another at apices on the outer surface of the wall advantageously providing a sufficient number of equally spaced external grasping surfaces to facilitate the manipulation of the gauges during driving.

Figure 5:
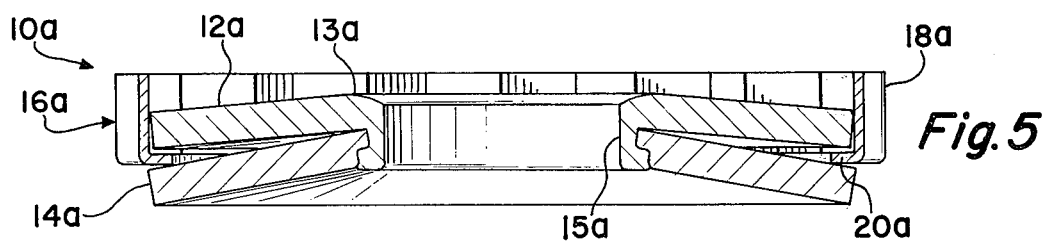
FIG. 5 is a cross-sectional view of a modified embodiment of the invention.

Turning now to FIG. 5, a further important aspect of the invention will be shown and described. The washer unit 10a includes an upper washer 12a and lower conical washer 14a with a ring gauge member 16a surrounding the upper washer and including a flange 20a interposed between the upper and lower washer. It should be noted that the upper washer is formed so that the upper surface thereof includes a slight draft outwardly from the inner peripheral margin and the aperture 15a. In effect, the upper washer 12a may be a conical washer having less taper than the lower conical washer. Such a construction insures that the clamping force applied by the fastener unit, such as a bolt head, is exerted at the inner marginal surface of the washer 12a rather than in a region of the unit adjacent the gauge flange 20a.

The inner peripheral margin 13a of such a washer will be the first and primary contact region between the bearing surface of a bolt or nut and thus insures that the compression of the lower washer is the only movement that effects the gauge. A bolt head is conventionally formed from cold heading techniques which may have large tolerances and could provide an initial force to be applied outwardly at the wire periphery of the unit. The taper of the lowermost washer 14a will be of a greater angle than that of the upper washer to insure that the thickness of the gauge flange 20a can be freely accommodated when the system is at rest.

Figure 6:
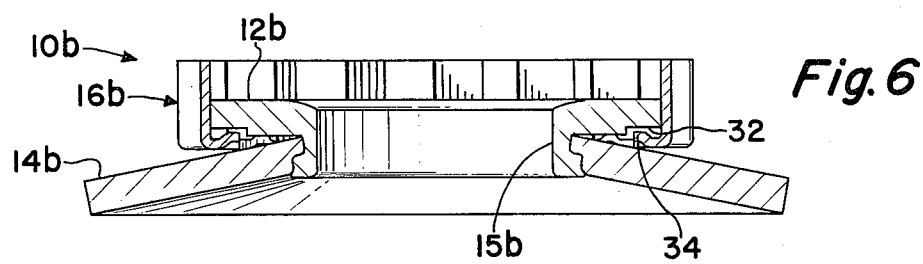
FIG. 6 is a cross-sectional view of another modification of the invention.

In FIG. 6 a still further embodiment of the invention is shown wherein washer unit 10b is provided with a recess 32 in the outer peripheral margin of the undersurface of washer 12b. The flange of the gauge includes a plurality of compressible protuberances or dimples 34. The thickness of the flange in the region of the protuberances 34 will be greater than the designed thickness of the gauge. The depth of the recess 32 will be the designed thickness of the gauge. The cooperation of the recess 32 and the dimples 34 serves to accurately size the gauge and eliminates any discrepancies or errors which may occur due to tolerances of materials. As the unit 10b is compressed the dimples 34 are compressed to the accurate size required to produce an indication of the appropriate tension level. The use of recesses such as that described also enables the tension indicating system to be utilized when a relatively flat or weak conical washer is required in the system.

Figure 7:
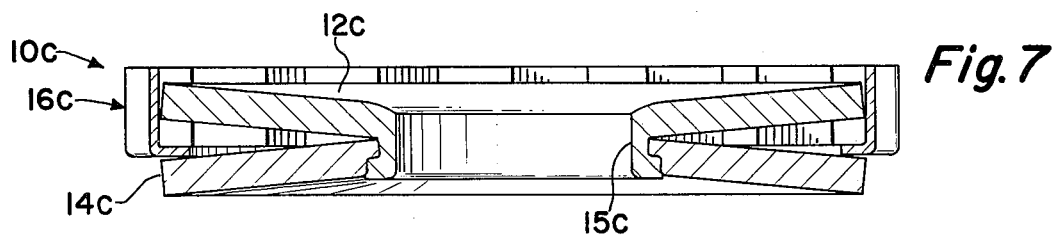
FIG. 7 is a cross-sectional view of yet another modification of the invention.

FIG. 7 describes yet a further embodiment of the invention wherein a pair of conical-type washers are preassembled and diverge away from one another. Upper washer 12c and lower washer 14c are assembled with the gauge 16c therebetween in a manner consistent with the embodiments described above. Unit 10c, however, does provide two spring washers in the system. Such a design may be appropriate and desirable when the application requires a maximization of the spring capabilities in a joint where a thin washer material is desired and the washer is to span a relatively large slot or aperture. Such a design also maximizes the initial gap between the washers accommodating the ring gauge. Again, this may be important when the application requires that relatively flat conical washers are to be used.

Figure 8:
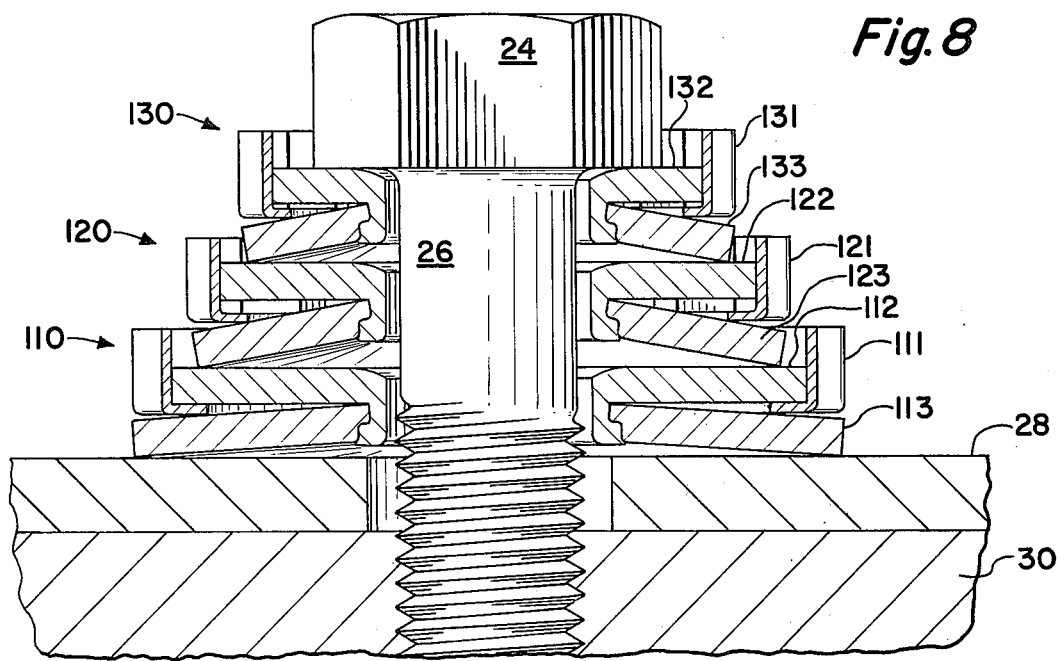
FIG. 8 is a vertical sectional view showing a plurality of serially arranged washer units of the invention.

A further important feature of the invention is the ability to be utilized in a joint to indicate a plurality of different tension levels. For example, FIG. 8 shows three washer units stacked upon one another in a coaxial arrangement. Washer unit 110 is the lowermost unit and is of the largest diameter. Washer unit 120 is placed above washer unit 110 so that the spring washer member 123 bears upon the uppermost washer 112 of unit 110. Likewise, upper washer unit 130 is placed so that its conical washer 133 bears against the uppermost washer 122 of unit 120. The joint described in FIG. 8 has the capability of providing an indication of the attainment of a plurality of increasing tension levels in a joint. The unit 110 will be the first to compress and clamp gauge 111 into nonrotative position while the upper unit gauges 121 and 131 are still free to rotate relative to their respective washers. As the tension in the joint increases, gauge 121 will be clamped between washers 122 and 123 while gauge 131 is still free to rotate. Obviously, any variety of combinations utilizing the invention can be devised with the arrangement shown in FIG. 8 merely representative of the capabilities of the invention to provide a serial indication of tension in a joint.

It is important to note that all of the embodiments described above incorporate a three piece unit preassembled so that such a unit may be shipped and stored independently of the primary clamping fasteners. It is important to note, also, that the units of the present invention can be utilized without concern for the style and size of the primary fasteners to be used or without concern for the various tolerances and finishes that may be provided on the primary fastener units. Three piece fastener units of the present invention can, therefore, be manufactured and calibrated for shipment and used for reliably indicating tension at a predetermined level independent of the conditions at the end application.

Thus, it is apparent that there has been provided in accordance with the invention a preassembled fastener washer unit that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. A multipiece, preassembled washer unit comprising at least two superimposed, coaxial washer members, means interconnecting the washer members from relative axial movement, the bottommost of said washer members being a cone-like spring device, a ring gauge member interposed between at least the outer marginal regions of the superimposed washer members, the ring gauge comprising a radially extending flange portion retaining the gauge on the unit and adapted to be pinched between the outer marginal regions of the washer members, the gauge further including side wall portions extending generally perpendicularly of the flange to surround and locate the gauge relative to the uppermost of the superimposed washer members, the side wall portions comprising vertical corrugations about the entire periphery consisting of a plurality of V-shaped wall sections with the apices of said sections extending substantially parallel to the axis of the fastener and extending from the uppermost edge of the side wall to the flange the apices of said vertical corrugations being closely spaced from each other and contacting the outer periphery of the uppermost washer thereby providing a means for laterally sizing the gauge on the uppermost washer and for eliminating free lateral movement of the radially extending flange of the gauge relative to said washer, said plurality of V-shaped wall sections being directly interconnected to one another at apices on the outer surface of said wall, said outer surface thus being provided with external grasping means for said gauge, wherein the unit may be associated with a rotary threaded fastener member in such a manner as to simultaneously provide spring take-up capabilities to a fastened joint while providing an indication of the attainment of a predetermined tension level in the joint when the conical spring member has been compressed an amount directly relatable to the predetermined tension level, said indication being the pinching of the ring gauge between the washer members to restrain the gauge from free rotation relative to the washer members.

2. The washer unit in accordance with claim 1, wherein both washer members are cone-like spring devices interconnected at their inner peripheral margins.

3. The washer unit in accordance with claim 2, wherein the cone-like washer members taper in the same direction.

4. The washer unit in accordance with claim 2, wherein the cone-like washer members taper in opposing directions.

5. The washer unit in accordance with claim 3, wherein the angle of the cone of the uppermost washer to its base is less than the angle of the cone of the lowermost washer to its base.

6. The washer unit in accordance with claim 1, wherein the uppermost washer member on the unit is generally flat and the lowermost washer is a cone-like spring washer, the side walls of the gauge being located and in surrounding contact with the peripheral edge of the flat washer.

7. The washer unit in accordance with claim 1, wherein the upper surface of the upper washer includes a slight downward draft so that the inner peripheral margin of said upper washer is higher than the remaining portions of the upper surface to insure that the compressive force acting on the unit is applied at said inner periphery rather than adjacent the regions of clamping of the ring gauge flange portion.

8. The washer unit in accordance with claim 1, wherein at least one of the facing surfaces of the washers includes an outer margin recess means and the flange of the ring gauge includes compressible protuberances, the original thickness of the region of the flange including the protuberances being greater than the depth of the recess means so that the flange may be accurately sized during compression of the washers.

9. The washer unit in accordance with claim 1, wherein the lower, outer marginal surface of the uppermost washer member is recessed to receive the radially extending flange of the ring gauge.

10. In combination with a rotary threaded fastener, at least two washer units of claim 1 superimposed in series about the axis of the rotary threaded fastener, a first preassembled washer unit including a ring gauge with side walls having a diameter greater than the diameter of the lowermost washer of a second unit superimposed on the first unit, wherein the plurality of units operate to successively indicate increasing tension levels attained in a joint.

* * * * *